United States Patent
Gaudig

(10) Patent No.: US 10,377,324 B2
(45) Date of Patent: Aug. 13, 2019

(54) TRIM MODULE FOR A PILLAR OF A MOTOR VEHICLE

(71) Applicant: GM GLOBAL TECHNOLOGY OPERATIONS LLC, Detroit, MI (US)

(72) Inventor: Ralf Gaudig, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 15/623,467

(22) Filed: Jun. 15, 2017

(65) Prior Publication Data

US 2017/0361783 A1    Dec. 21, 2017

(30) Foreign Application Priority Data

Jun. 16, 2016 (DE) .......................... 10 2016 007 381

(51) Int. Cl.
*B60R 21/16* (2006.01)
*B60R 13/02* (2006.01)
(Continued)

(52) U.S. Cl.
CPC ........ *B60R 13/0275* (2013.01); *B60R 21/213* (2013.01); *B60R 21/215* (2013.01);
(Continued)

(58) Field of Classification Search
CPC . B60R 13/0275; B60R 21/213; B60R 21/215; B60R 2021/21537; B60R 2013/0287
(Continued)

(56) References Cited

U.S. PATENT DOCUMENTS 6,302,434 B2 * 10/2001 Nakajima ............. B60R 21/213
                                                         280/730.1
6,502,855 B1 *  1/2003 Greiner ................... B60R 13/02
                                                         280/728.2
(Continued)

FOREIGN PATENT DOCUMENTS

DE    102014015030 A1    4/2016
EP       0730947 A2      9/1996
(Continued)

OTHER PUBLICATIONS

German Patent Office, German Search Report for German Application No. 202015008707.8, dated Oct. 11, 2016.

*Primary Examiner* — Toan C To
(74) *Attorney, Agent, or Firm* — Lorenz & Kopf, LLP

(57) ABSTRACT

A trim module is disclosed for a pillar of a motor vehicle, in particular for an A-pillar of a motor car. The trim module includes a trim body, a basic body configured to connect to the pillar, a latch and a jointed connection. The trim body includes a pivot portion pivotable about the jointed connection and facing the interior of the motor vehicle. The basic body includes a connecting portion, a bearing portion and a support portion. The support portion is formed in the direction of the pivot portion. The pivot portion, the bearing portion and the support portion form a first receiving region for an inflatable airbag. The pivot portion and the bearing portion are detachably connected to one another by the latch and the jointed connection is formed on the side of the support portion facing away from the first receiving region.

14 Claims, 5 Drawing Sheets

(51) Int. Cl.
*B60R 21/213* (2011.01)
*B60R 21/215* (2011.01)
(52) U.S. Cl.
CPC ............... *B60R 2013/0287* (2013.01); *B60R 2021/21537* (2013.01)
(58) Field of Classification Search
USPC ..................................................... 280/730.2
See application file for complete search history.

(56) References Cited

U.S. PATENT DOCUMENTS

| | | | | |
|---|---|---|---|---|
| 6,974,152 | B2* | 12/2005 | Hanjono | ............... B60R 21/04 280/728.3 |
| 7,520,527 | B2* | 4/2009 | Yamagiwa | ............ B60R 21/213 280/728.2 |
| 7,735,857 | B2* | 6/2010 | Hidaka | ................. B60R 21/213 280/728.2 |
| 8,801,031 | B1 | 8/2014 | Zucal | |
| 2004/0227334 | A1* | 11/2004 | Chausset | ............... B60R 21/213 280/730.2 |
| 2006/0261580 | A1* | 11/2006 | Tiesler | ................. B60R 21/213 280/730.2 |
| 2009/0160165 | A1* | 6/2009 | Torii | ..................... B60R 13/025 280/730.2 |
| 2011/0191980 | A1 | 8/2011 | Yoon | |
| 2015/0217715 | A1 | 8/2015 | Kim | |
| 2016/0121773 | A1 | 5/2016 | Kwon | |

FOREIGN PATENT DOCUMENTS

| | | |
|---|---|---|
| FR | 2784637 A1 | 4/2000 |
| JP | 2012240619 A | 12/2012 |

* cited by examiner

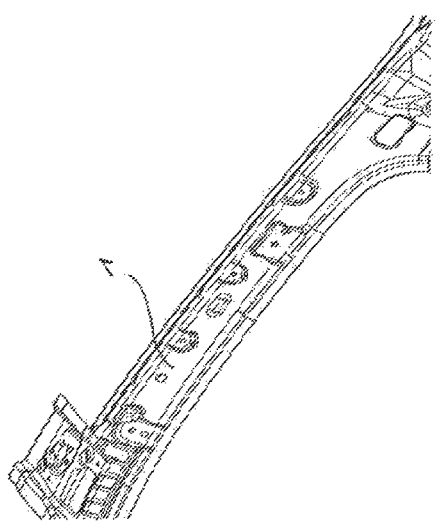
Fig. 1
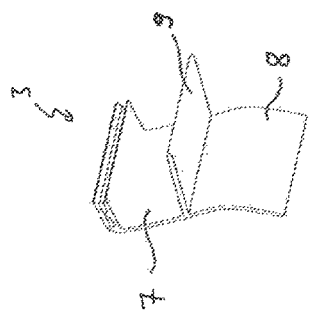
Fig. 2
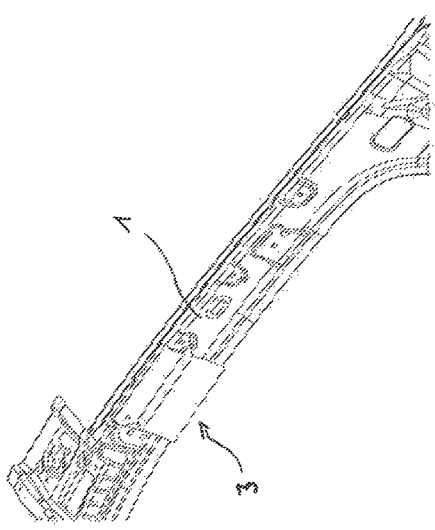
Fig. 3
Fig. 4

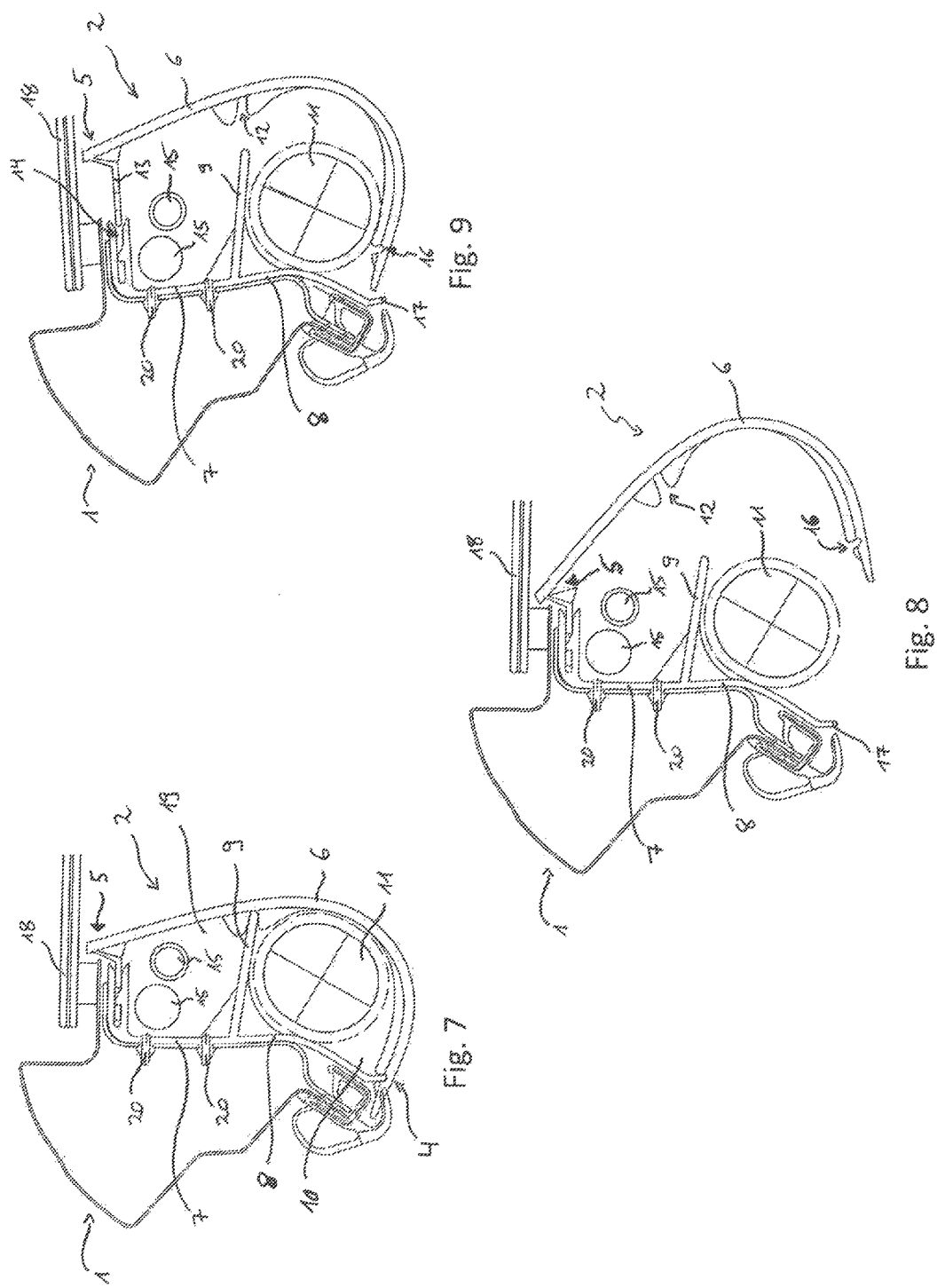

TRIM MODULE FOR A PILLAR OF A MOTOR VEHICLE

CROSS-REFERENCE TO RELATED APPLICATION

This application claims priority to German Patent Application No. 102016007381.0, filed Jun. 16, 2016, which is incorporated herein by reference in its entirety.

TECHNICAL FIELD

The present disclosure pertains to a trim module for a pillar of a motor vehicle, in particular for an A-pillar of a motor car.

BACKGROUND

Motor vehicles, in particular motor cars, typically include inflatable airbags. These airbags are arranged behind trim parts, for example between the pillar of a motor vehicle and the trim of the pillar. In the region of the A-pillar, so-called curtain airbags are frequently used.

Upon the releasing of the airbag it is necessary that the trim part covering the airbag exposes an outlet region for the airbag, so that the airbag can inflate in as unhindered a manner as possible and enter an interior region of the motor vehicle.

In order to avoid injury to persons that are present in the interior of the vehicle it is necessary to prevent that the trim and/or parts of the trim are flung into the vehicle interior in an uncontrolled manner. It has to be ensured, furthermore, that the trim does not obstruct the inflating of the airbag and in particular damaging of the airbag by the trim is avoided.

In the region of pillars, in particular in the region of the A-pillar, the trim parts covering the airbag are usually connected to the pillar by retaining clamps and/or retaining clips and/or catch straps. In particular, the catch strap holds the trim part detached by the airbag on the pillar and prevents uncontrolled entering of the trim part in the passenger interior.

DE 699 38 426 T2 discloses a trim fastening device for a motor vehicle pillar embodied in such a manner that it receives at least one part of an airbag unit. The trim part includes a plurality of support elements, which are fastened on the pillar and connected to the trim by way of joint elements and latching elements. These elements are arranged in such a manner that the airbag upon its inflation can unlatch the latching elements and pivot the trim on the support elements about the joint elements, by way of which a passage for the airbag is opened.

SUMMARY

The present disclosure provides a trim module for a pillar of a motor vehicle. The trim module upon releasing of an airbag ensures a brisk and safe opening of the trim part covering the airbag and the forming of as large as possible a passage opening for the airbag and a detaching of the trim or trim parts from the A-pillar. Thus an unhindered entering into the interior of the motor vehicle is prevented.

The trim module serves for covering a pillar of a motor vehicle, in particular for covering an A-pillar of a motor car. The trim module includes a trim body, a basic body that can be connected to the pillar, a latch and a jointed connection. The trim body includes a pivot portion that can be pivoted about the jointed connection and faces an interior of the motor vehicle. The basic body includes a connecting portion, a bearing portion and a support portion. The support portion is formed in the direction of the pivot portion. The pivot portion, the bearing portion and the support portion form a first receiving region for an inflatable airbag. The pivot portion and the bearing portion are detachably connected to one another by the latch, and the jointed connection formed on the side of the support portion facing the first receiving region.

Through the arrangement of the airbag in the first receiving region formed by the bearing portion, the support portion and the pivot portion, it is ensured that the forces that occur during the releasing of the airbag substantially act on the latch formed adjacent to the first receiving region. Thus even small forces emanating from the airbag unlatch the latch between pivot portion and bearing portion. Because of this, a quick and brisk opening of the trim is ensured. The forces emanating from the airbag are directed through the support portion in the direction of the latch. The inflating airbag supports itself on the support portion, as a result of which the expansion and/or movement of the airbag in the direction of the support portion is limited.

After the latch has been unlatched by the force effect of the airbag, the pivot portion pivots about the jointed connection under the force effect of the inflating airbag. Forming the jointed connection on the side of the support portion facing away from the first receiving region ensures that as high as possible a proportion of the force of the airbag acting on the pivot portion is converted into a pivot movement of the pivot portion and uncontrolled flinging away of parts of the trim or a splintering of the trim is thus prevented. Furthermore, the support portion prevents that the force effect of the airbag directly acts on the jointed connection. Because of this, damage or impairment of the function of the jointed connection by the releasing airbag is prevented.

The trim module thus ensures that the force effect of the airbag, in particular through the support portion, is directed in the direction of the latch in order to ensure as quickly as possible an unlatching of the latch and the jointed connection is protected by the support portion from being directly affected by the airbag. The jointed connection makes possible a pivot movement of the pivot portion, wherein additional retaining means, for example a catch strap for retaining the detaching trim part on the pillar can be omitted.

In an advantageous further development of the present disclosure it is provided that the support portion contacts the pivot portion. Through this arrangement, an additional stabilization between pivot portion and basic body is created. In particular, shifting of the pivot portion, in particular pressing-in of the pivot portion in the direction of the basic body and thus damage to the airbag is prevented.

It is provided, in particular, that the pivot portion includes a mounting for the support portion, preferentially the support portion can be plugged into the mounting. Because of this, the pivot portion and the basic body are advantageously fixed relative to one another, as a result of which for example rattling and/or unintentional detaching of the pivot portion is avoided.

It is considered particularly advantageous when the trim body and/or the basic body and/or the jointed connection form separate components. It is here provided, in particular, that during the assembly of the trim module the basic body is initially connected to the pillar of the motor vehicle and following this the trim body is connected to the basic body. The trim module may include a plurality of separate basic bodies which, spaced from one another, are connected to the pillar and following this a trim part is connected to the basic bodies. The trim part covers the basic bodies in the direction of the interior of the motor vehicle.

In a preferred embodiment, the basic body can be connected to the pillar in the region of the connecting portion. The connection may be effected by retaining clamps and/or retaining clips. Through the connection in the region of the connecting portion, the connections are protected from being directly affected by the releasing airbag.

It is considered advantageous when the trim body can be plugged into the basic body. Preferably, the trim body on the side of the support portion facing away from the first receiving region can be plugged into the basic body. Because of this, the trim module, and in particular the trim body can be mounted particularly easily and briskly without the use of tools. However, the trim body may be connected to the basic body by a screw connection and/or the jointed connection connects the basic body to the trim body.

With respect to the pluggable mounting of the trim body in the basic body, the trim body may include a hooking-in web, which may be plugged into a recess formed in the basic body. In a preferred embodiment, it is provided that the hooking-in web latches in the recess.

In a further development of the trim module, it is provided that the joint connection is formed in the trim body, in particular in the hooking-in web. The jointed connection may be formed as a film hinge or material weakening. The jointed connection may also be formed by a flexible material, preferentially by a non-tearing flexible material, in particular by a composite material.

In a preferred embodiment, the pivot portion, the connecting portion and the support portion form a second receiving region. The receiving region serves for receiving installation parts, for example cables, electrical components, lines or hoses. By arranging the installation parts in the second receiving region, the installation parts are protected from a force effect of the inflating airbag.

It is particularly advantageous when the basic body, on the side of the support portion facing away from the first receiving region, includes a retainer, such as a retaining clamp, for one of the installation parts. The latch may be formed by a part region of the pivot portion engaging behind the bearing portion. With such an embodiment of the trim module, a separate latch may be omitted.

The pivot portion on the side facing the interior of the vehicle may include a recess engaging a free end of the bearing portion. It is particularly advantageous when the jointed connection is formed adjacent to an edge region of the connecting body. In particular, the jointed connection may be arranged adjacent to window pane, in particular a windshield of the motor vehicle. In a preferred embodiment, the basic body includes a retainer for the airbag in the first receiving region.

BRIEF DESCRIPTION OF THE DRAWINGS

The present disclosure will hereinafter be described in conjunction with the following drawing figures, wherein like numerals denote like elements.

FIG. 1 shows a partially represented A-pillar of a motor vehicle with a first embodiment of the trim module in a perspective view, FIG. 2 shows the arrangement according to FIG. 1 without trim module, FIG. 3 shows the arrangement according to FIG. 2 with a basic body, FIG. 4 shows the basic body according to FIG. 3 in a perspective view, FIG. 7 shows the arrangement according to FIG. 1 in a sectional view according to the line VII-VII, FIG. 8 shows the arrangement according to FIG. 7 with a partially pivoted pivot portion, FIG. 9 shows the arrangement according to FIG. 7 prior to connecting the trim body to the basic body.

DETAILED DESCRIPTION

Figure 6:
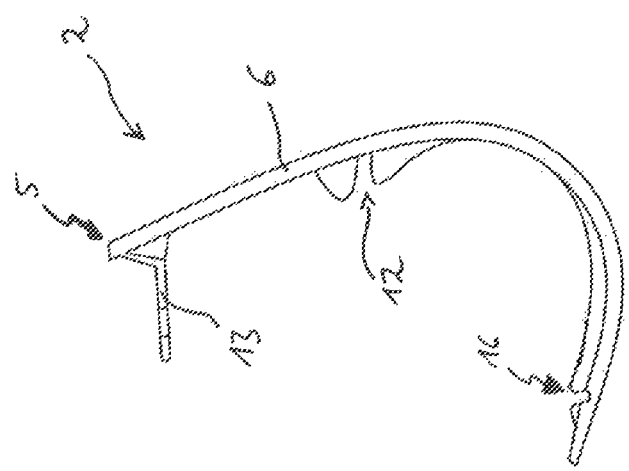
FIG. 6 shows a trim body according to FIG. 1 in a lateral view.
Figure 5:
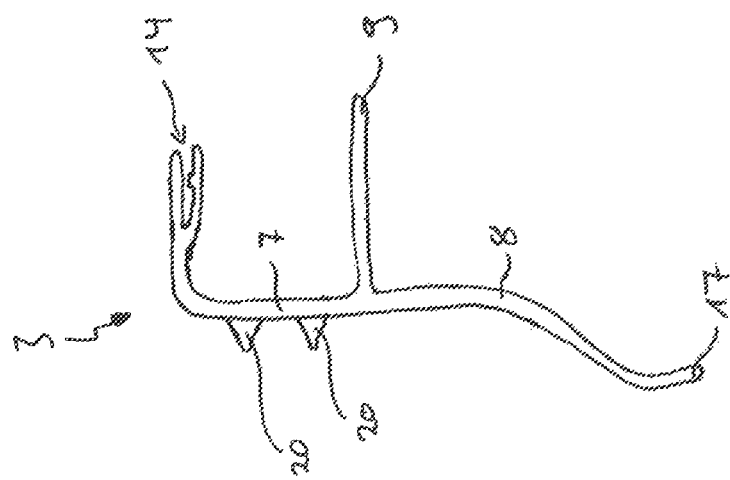
FIG. 5 shows the basic body according to FIG. 4 in a lateral view.

The following detailed description is merely exemplary in nature and is not intended to limit the invention or the application and uses of the invention. Furthermore, there is no intention to be bound by any theory presented in the preceding background of the invention or the following detailed description.

FIGS. 1 to 3 show an A-pillar 1 of a motor vehicle. The A-pillar 1 according to FIG. 1 is at least partially covered by a trim module in the direction of a vehicle interior. The trim module includes a trim body 2 facing the interior of the motor vehicle and a basic body 3 that can be connected to the pillar.

The trim body 2 can be plugged into the basic body 3. The trim body 2 includes a pivot portion 6 that can be pivoted about a jointed connection 5. The jointed connection 5 is formed adjacent to an edge region of the trim body 2 and adjacent to a windshield 18 of the motor vehicle.

The basic body 3 includes a connecting portion 7, a bearing portion 8 and a support portion 9. The support portion 9 is formed in the direction of the pivot portion 6 and can be plugged into a mounting 12 of the pivot portion 6. As is evident from FIGS. 7 to 9, the basic body 3 is connected in the region of the connecting portion 7 to the pillar 1 of the motor vehicle by retaining clamps 20.

The pivot portion 6, the bearing portion 8 and the support portion 9 form a first receiving portion region 10. In this receiving region 10 an inflatable airbag 11 is arranged. The pivot portion 6 and the bearing portion 8 are detachably connected to one another by a latch 4. The latch 4 is formed by a part region of the pivot portion 6 engaging behind the bearing portion 8. Here, the pivot portion 6, on the side facing away from the interior of the vehicle, includes a recess 16 and a free end 17 of the bearing portion 8 engages in this recess. As is evident in particular from FIGS. 7 to 9, the jointed connection 5 is formed on the side of the support portion 9 facing away from the first receiving region 10.

The trim body 2 can be plugged in or is plugged into the basic body 3. The trim body 2 on its side facing away from the latch 4 includes a hooking-in web 13. The hooking-in web 13 can be plugged into a recess formed in the connecting portion 7 of the basic body 3. When the hooking-in web 13 is plugged into the recess 14, the hooking-in web 13 engages as a result of which unintentional detaching of the trim body 2 from the basic body 3 is prevented.

The process of connecting the trim body 2 to the basic body 3 is shown in FIG. 9. The trim body 2 for the purpose of assembly is moved in the direction of the A-pillar 1. FIG. 7 shows the trim module prior to the releasing of the airbag 11 and thus in a closed, unpivoted state of the pivot portion 6. FIG. 8 shows the trim module in an opened state. Here, the pivot portion 6 of the trim body 2 is pivoted about the jointed connection 5 in the direction of the windshield 18, as a result of which a passage opening to the first receiving region 10 is created, wherein this passage opening makes possible unhindered inflating and emerging of the airbag 11 from the receiving region 10 into the interior of the motor vehicle.

Through the supporting on the support portion 9, the force effect of the releasing airbag 11 is directed onto the latch 4, in particular the part region of the pivot portion 6 including the recess 16 in such a manner that the latch 4 is unlatched even upon smallest expansion of the airbag 11. Following the unlatching of the latch 4, the force effect of the airbag 11 leads to a pivoting of the pivot portion 6, as a result of which a controlled rotation of the pivot portion 6 about the jointed connection 5 is initiated and thus the passage opening created.

Adjoining the first receiving region 10, a second receiving region 19 is formed by the pivot portion 6, the connecting portion 7 and the support portion 9. This second receiving region 19 serves for arranging installation parts 15. These installation parts 15 can for example be cables, electrical components for an interior lighting and/or for a camera, lines or hoses, in particular water drain hoses for a sliding roof.

Figure 10:
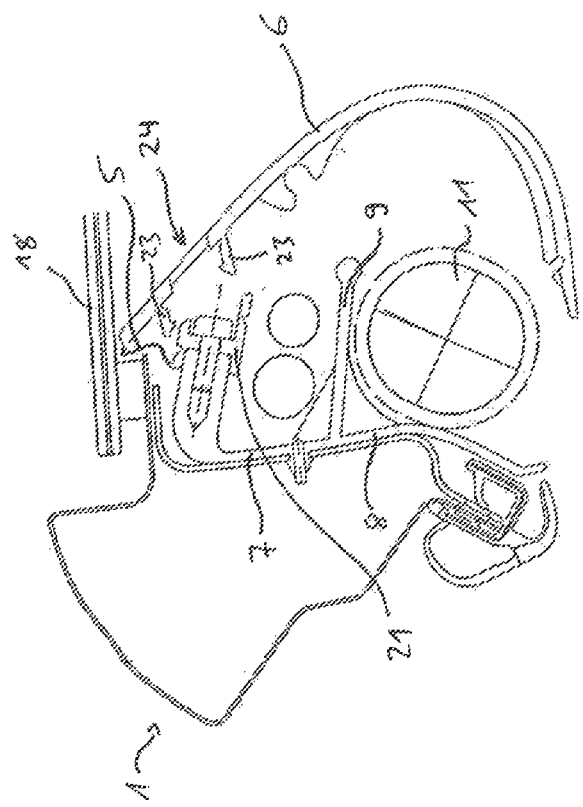
FIG. 10 shows another embodiment of the trim module in a view as in FIG. 7.
Figure 11:
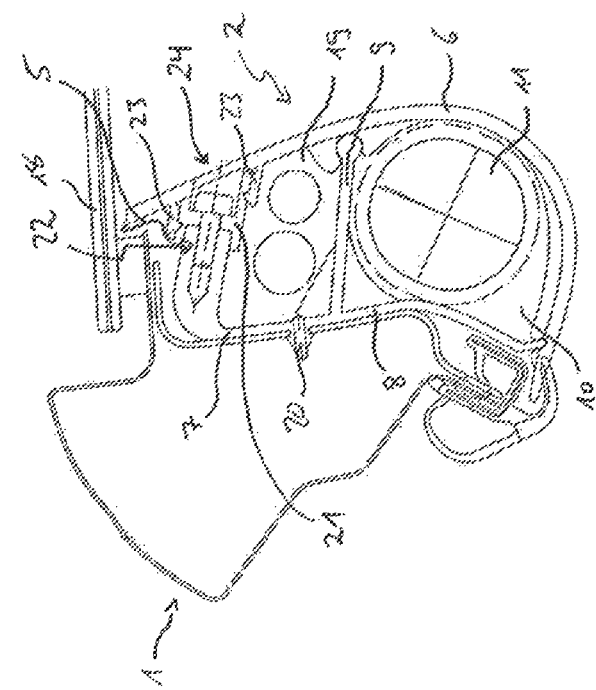
FIG. 11 shows the arrangement according to FIG. 10 with a partially pivoted pivot portion.

FIGS. 10 and 11 show another exemplary embodiment of the trim module, which differs from the first exemplary embodiment in that a part region 21 of the trim body 2 adjoining the jointed connection 5 is connected to the basic body 3 in the region of the connecting portion 7 by a threaded fastener or screw connection 22. The pivot portion 6 includes an access opening 24 to the screw connection 22.

On its side facing the interior of the vehicle, the pivot portion 6 includes two fixing elements 23, which connect the pivot portion 6 to the part region 21 of the trim body 2, which is in turn connected to the basic body 3. When the airbag 11 is released, the fixing elements 23 are disconnected because of the force effect of the airbag 11 and thereby a pivoting of the pivot portion 6 about the jointed connection 5 is enabled.

Figure 12:
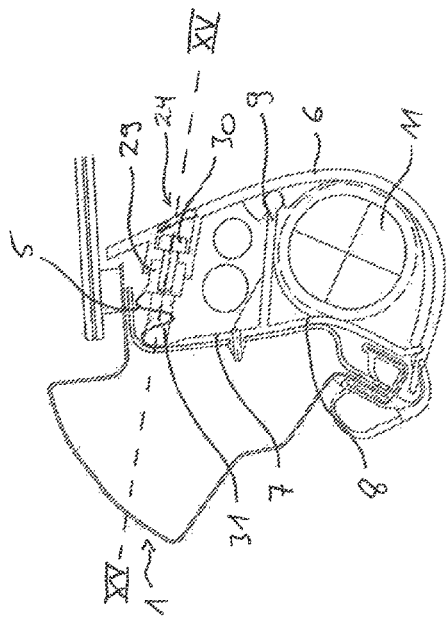
FIG. 12 shows another embodiment of the trim module in a view as in FIG. 7.

FIG. 12 shows yet another exemplary embodiment of the trim module, which differs in the region of the latch 4 from the other second exemplary embodiments. On the side facing away from the interior of the vehicle, the pivot portion 6 includes a latching web 25 wherein the latching web 25 includes a retaining portion 26 on its end facing away from the pivot portion 6. The bearing portion 8 is angled L-shaped and has a passage opening 27 in the region of the angling facing the pivot portion 6 and substantially in pivot direction.

In order to facilitate the assembly, the passage opening 27 includes a cross section which expands in the direction of the pivot portion 6 as a result of which introducing the latching web 25 is facilitated for example by pivoting the pivot portion 6 or by shifting the trim body 2 in the direction of the basic body 3.

Figure 13:
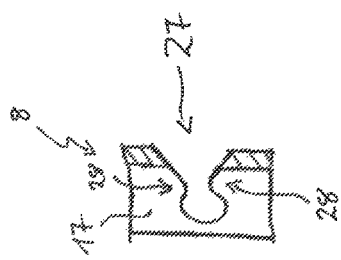
FIG. 13 shows a part region of the basic body according to FIG. 12 in a sectional view according to the line XIII-XIII in FIG. 12.

As is evident from FIG. 13, the passage opening 27 is configured in the region of the free end 17 of the bearing portion 8 in such a manner that the passage opening 27 includes a necking 28. The latching web 25 in the latched state is arranged latched in the passage opening 27 on the side of the necking 28 facing away from the pivot portion, and the retaining portion 26 engages behind the free end 17 of the bearing portion 8 in the edge region of the passage opening 27. As a result, a stable latching 4 of the pivot portion 6 against unintentional opening, in particular by a force effect in the direction of the latching web 25 is ensured and yet guaranteed that the latch 4 is unlatched even with the slightest expansion of the airbag 11.

Figure 14:
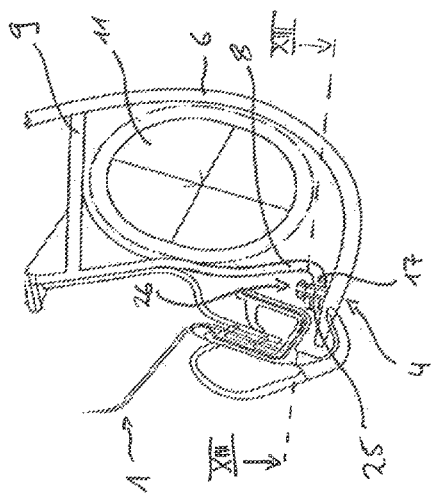
FIG. 14 shows a fourth embodiment of the trim module in a view as in FIG. 7.

FIG. 14 shows another exemplary embodiment of the trim module, which differs from the first two above-described exemplary embodiments substantially in that the trim module includes a mounting 29 for a fastener 30 for connecting the pivot portion 6 to the jointed connection 5. The fastener 30 may be in the form of a threaded fastener or screw. The mounting 29 is connected to the jointed connection 5 and the jointed connection 5 in turn to the connecting portion 7. In order to facilitate connecting pivot portion 6 and jointed connection 5, the pivot portion 6 includes an access opening 24 to the mounting 5.

Figure 15:
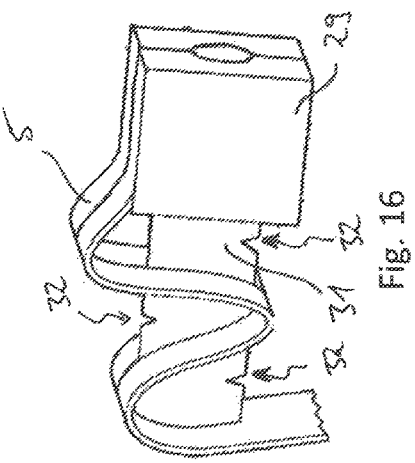
FIG. 15 shows a part region of the trim module according to FIG. 14 in a sectional view according to the line XV-XV in FIG. 14.
Figure 16:
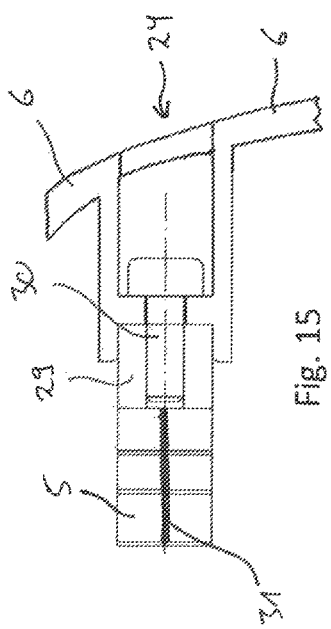
FIG. 16 shows a part region of the trim module according to FIG. 14 in a perspective view.

A sectional representation of the trim module in the region of the mounting 29 and a perspective representation of the mounting 29 and jointed connection connected therewith are shown by FIGS. 15 and 16. The mounting 29 is connected to the connecting portion 7 in a rotationally fixed and pivotably fixed manner by a connecting web 31, as a result of which a fixed positioning of the mounting 29 on the basic body 3 is ensured and because of this upon the assembly of the trim body 2 the connecting of the pivot portion 6 to the mounting 29 is facilitated.

The connecting web 31 includes a plurality of weakened locations 32. These weakened locations 32 ensure a breaking of the connecting web 31 when the airbag 11 is released, as a result of which the pivoting of the pivot portion 6 about the jointed connection 5 is made possible. The jointed connection 5 is formed as a strap, wherein the connecting web 31 penetrates the strap.

The shown embodiments merely show possible configurations within the scope of the present disclosure to which further numerous versions and/or combinations may be achieved.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A trim module for a pillar of a motor vehicle comprising:
   a trim body having a pivot portion configured to face an interior of the motor vehicle and pivot about a jointed connection;

a basic body having a connecting portion configured to be connected to the pillar, a bearing portion and a support portion formed in the direction of the pivot portion;

a latch detachably connecting the pivot portion to the bearing portion; and wherein the pivot portion, the bearing portion and the support portion form a first receiving region for an inflatable airbag and the jointed connection is formed on a side of the support portion facing away from the first receiving region, the trim body is plugged into the basic body on the side of the support portion facing away from the first receiving region, the trim body comprises a hooking-in web configured to plug into a recess formed in the basic body, and the recess is formed in the connecting portion and the hooking-in web latches in the recess.

2. The trim module according to claim 1, wherein the support portion contacts the pivot portion.

3. The trim module according to claim 1, wherein the pivot portion comprises a mounting for the support portion, wherein the support portion is plugged into the mounting.

4. The trim module according to claim 1, wherein at least one of the trim body, the basic body and the jointed connection form separate components.

5. The trim module according to claim 1, wherein the basic body is configured to be connected to the pillar in the region of the connecting portion.

6. The trim module according to claim 1, wherein the jointed connection is formed in the trim body.

7. The trim module according to claim 1, wherein the jointed connection comprises one of a film hinge, a material weakening or a flexible, non-tearing material.

8. The trim module according to claim 1, wherein the pivot portion, the connecting portion and the support portion form a second receiving region configured to receive an installation part.

9. The trim module according to claim 1, wherein in a side of the support portion facing away from a first receiving region in the basic body comprises a retainer for an installation part.

10. The trim module according to claim 1, wherein the latch is formed by a part region of the pivot portion engaging behind the bearing portion.

11. The trim module according to claim 10, wherein the pivot portion comprises a recess on a side facing away from the interior of the vehicle, wherein a free end of the bearing portion engages in the recess.

12. The trim module according to claim 1, wherein the jointed connection is formed adjacent to an edge region of the trim body.

13. The trim module according to claim 1, wherein the jointed connection is configured to be arranged adjacent to a windshield of the motor vehicle.

14. The trim module according to claim 1, wherein the basic body comprises retainer configured to secure an airbag in the first receiving region.

* * * * *